US012672219B2

(12) United States Patent
Rölleke et al.

(10) Patent No.: US 12,672,219 B2
(45) Date of Patent: Jun. 30, 2026

(54) METHOD FOR CONTROLLING AND/OR REGULATING A HIGH-DEFINITION LIGHT-EMITTING DIODE LAMP

(71) Applicant: Hella GmbH & Co. KGaA, St. Louis (DE)

(72) Inventors: Peter Rölleke, Soest (DE); Igor Uwarow-Knüwer, Lichtenau-Atteln (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 65 days.

(21) Appl. No.: 18/651,893

(22) Filed: May 1, 2024

(65) Prior Publication Data

US 2024/0381510 A1 Nov. 14, 2024

(30) Foreign Application Priority Data

May 11, 2023 (DE) ......................... 102023112441.2

(51) Int. Cl.

*H05B 47/10* (2020.01)
*H05B 45/12* (2020.01)
*H05B 45/325* (2020.01)
*H05B 47/11* (2020.01)
*F21S 41/153* (2018.01)

(52) U.S. Cl.

CPC ............. *H05B 47/11* (2020.01); *H05B 45/12* (2020.01); *H05B 45/325* (2020.01); *F21S 41/153* (2018.01)

(58) Field of Classification Search

CPC ........ H05B 45/10; H05B 45/12; H05B 45/30; H05B 45/325; H05B 47/10; H05B 47/11; F21S 41/153

See application file for complete search history.

(56) References Cited

U.S. PATENT DOCUMENTS

2017/0234976 A1* 8/2017 Grauer .................... G01S 17/18
356/5.04

FOREIGN PATENT DOCUMENTS

| | | | |
|---|---|---|---|
| CN | 216101799 U * | 3/2022 |
| DE | 102009054227 A1 | 5/2011 |
| DE | 102013001273 A1 | 7/2014 |
| DE | 202013012937 U1 | 8/2022 |
| WO | 2016070961 A1 | 5/2016 |

* cited by examiner

*Primary Examiner* — Jimmy T Vu
(74) *Attorney, Agent, or Firm* — Husch Blackwell LLP

(57) ABSTRACT

A method for controlling and/or regulating a high-definition light-emitting diode lamp with a plurality of light-emitting diodes includes the following steps: acquiring sensor data regarding a current environmental and operating situation for the light-emitting diode lamp; creating a digital image of a desired light distribution based on the sensor data; evaluating the digital image to control and/or regulate the light-emitting diodes based on at least one operating parameter for the light-emitting diode lamp; and controlling and/or regulating the light-emitting diodes to generate a desired light distribution based on the evaluation. Such steps are carried out dynamically.

20 Claims, 1 Drawing Sheet

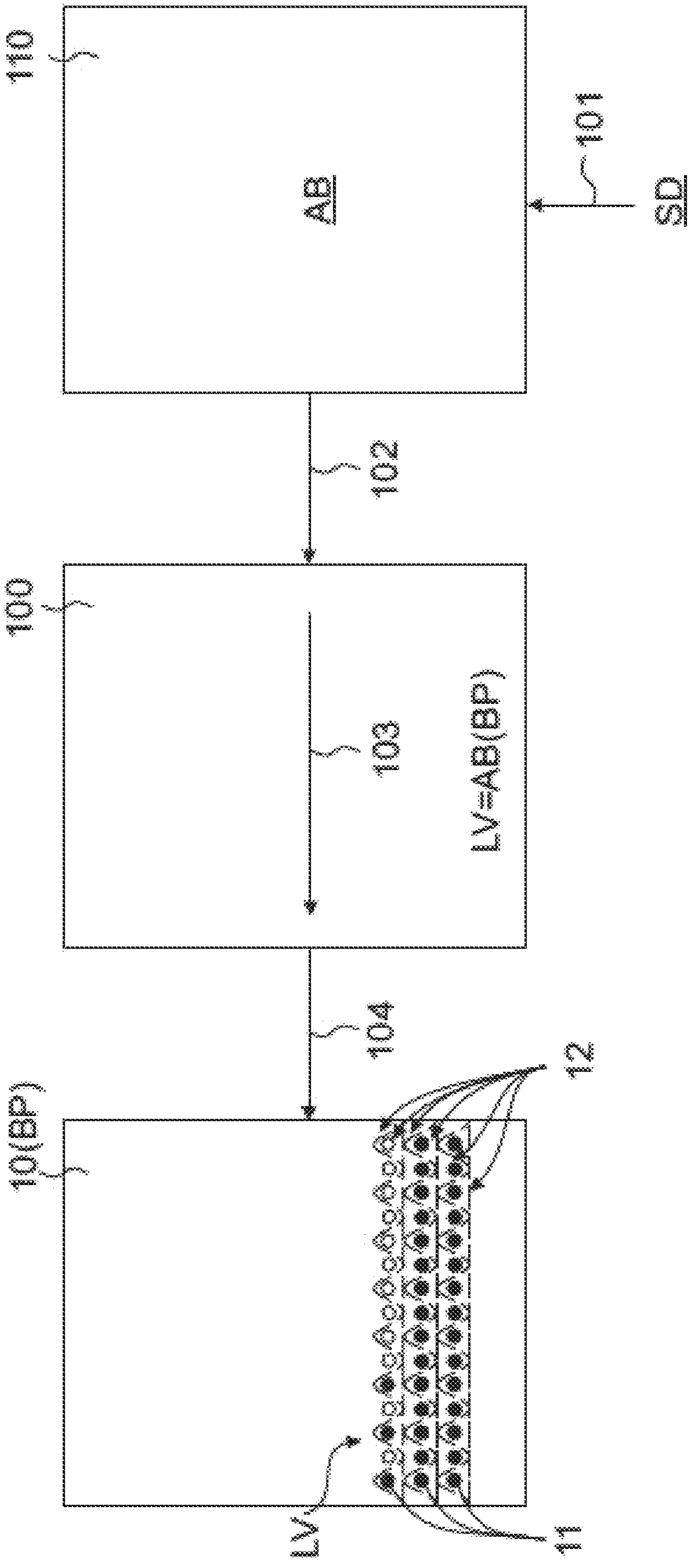
110
AB
101
SD
102
100
103
LV=AB(BP)
104
10(BP)
12
LV
11

METHOD FOR CONTROLLING AND/OR REGULATING A HIGH-DEFINITION LIGHT-EMITTING DIODE LAMP

CROSS REFERENCE

This application claims priority to German Application No. 10 2023 112441.2, filed May 11, 2023, the entirety which is hereby incorporated by reference.

FIELD OF THE INVENTION

The invention relates to a method for controlling and/or regulating a high-definition light-emitting diode lamp, preferably with numerous, e.g. 16,000 to 25,000, light-emitting diodes, preferably for a vehicle, particularly preferably for when the vehicle is moving, in which the environmental and operating conditions of the light-emitting diode lamp can change dynamically. The invention also relates to a corresponding computer program with which the method is executed. The invention also relates to a corresponding control unit for executing the method. The invention also relates to a corresponding light-emitting diode lamp with such a control unit.

BACKGROUND OF THE INVENTION

There are numerous methods for controlling LED light sources in headlamps (HD SSL-headlamps: high-definition solid state lighting). The LED light sources used for this are usually arranged in arrays with a large number of LEDs (e.g. 16,000 to 25,000) on a single semiconductor substrate. The brightness of each of these LEDs can be controlled individually. A high-definition light distribution can be generated therewith.

A fixed performance level is usually defined by amperages and voltages for the LED array in the existing methods with which a defined light distribution can be generated for every application. This defined light distribution is not necessarily optimal for all environmental and operating conditions.

BRIEF SUMMARY OF THE INVENTION

The object of the invention is to therefore overcome at least one of the disadvantages described above. In particular, the object of the invention is to create a better method for controlling and/or regulating a high-definition light-emitting diode lamp, preferably containing numerous, e.g. 16,000 to 25,000, light-emitting diodes (LEDs), preferably for a vehicle, particularly preferably for when the vehicle is moving. It is also the object of the invention to create a better method for controlling and/or regulating a high-definition light-emitting diode lamp with which an optimal light distribution can be adjusted dynamically, which can be adapted to changes in the environmental and operating conditions for the light-emitting diode lamp, in particular while the vehicle is moving. It is also the object of the invention to create a better method for controlling and/or regulating a high-definition light-emitting diode lamp with which the light-emitting diode lamp can be operated efficiently, reducing thermal power losses when the light-emitting diode lamp is on, decreasing the degradation of the light-emitting diodes, increasing the light output when the light-emitting diode lamp is on, increasing customer convenience, and increasing safety, in particular when the vehicle is moving. It is also the object of the invention to create a corresponding computer program for executing the method. It is furthermore the object of the invention to provide a corresponding control unit for executing the method. It is also the object of the invention to create a corresponding light-emitting diode lamp with such a control unit.

These problems are solved by a method for controlling and/or regulating a high-definition light-emitting diode lamp, preferably with numerous, e.g. 16,000 to 25,000, light-emitting diodes (LEDs), preferably for a vehicle, particularly preferably for when the vehicle is moving, which has the features of the independent method claim. These problems are also solved by a corresponding computer program for executing the method that has the features of the independent product claim. The above object is also achieved by a corresponding control unit for executing the method that has the features of the independent device claim. These problems are also solved by a corresponding light-emitting diode lamp with such a control unit that has the features of the coordinate independent device claim. The features relating to different aspects of the invention can be combined with one another without abandoning the framework of the present disclosure.

The invention results in a method for controlling and/or regulating a high-definition light-emitting diode lamp, preferably with numerous, e.g. 16,000 to 25,000, light-emitting diodes, which can be arranged in an LED array, or LED matrix, etc. e.g. on a single semiconductor substrate. The light-emitting diode lamp can be a headlamp (a HD SSL headlamp: high-definition solid state lighting). The light-emitting diode lamp can preferably be used in a vehicle, particularly preferably when the vehicle is moving.

The method contains the following steps, which can all be executed dynamically: acquiring sensor data regarding current environmental and operating conditions for the light-emitting diode lamp, in particular in the form of corresponding environmental and operating conditions for the vehicle; creating a digital image, preferably in the form of a video, of a desired light distribution based on the sensor data; evaluating the digital image to control and/or regulate light-emitting diodes based on at least one operating parameter for the light-emitting diode lamp, which is to be set in particular for the desired light distribution; and controlling and/or regulating the light-emitting diodes to generate the desired light distribution based on the evaluation.

A high-definition light distribution can be generated by this means that is adjusted dynamically to the respective environmental and operating conditions. A digital image (e.g. a single frame from a series of video images) of a desired light distribution (EN: desired light picture) can be calculated that is based on the current environmental and operating conditions. The digital image can be created in a higher order control unit in the vehicle, and sent to the control unit for the light-emitting diode lamp. It is also fundamentally possible for the digital image to be created directly in the control unit for the light-emitting diode lamp. In this case, the control unit for the light-emitting diode lamp can obtain the sensor data relating to the current environmental and operating conditions for the light-emitting diode lamp or for the vehicle from the higher order control unit.

The control unit for the light-emitting diode lamp can preferably evaluate the digital image based on at least one operating parameter for the light-emitting diode lamp, as shall be explained in greater detail below. The individual LEDs in the light-emitting diode lamp can be controlled on the basis of the evaluation to generate the appropriate high-definition light distribution in front of the vehicle with the LED array.

The sensors for detecting the environmental and operating conditions can include, e.g., a front camera, sensors for detecting a tilting of the vehicle, steering angle sensors, speed sensors, GPS data, etc. Because the environmental and operating conditions change dynamically, the desired light distribution (and the digital image for controlling the LED arrays) is constantly recalculated, in that a new video frame is created every 10 milliseconds that contains the digital image of the desired light distribution, such that 100 "images" are generated each second.

The brightness of each LED in the array can be controlled individually through pulse-width modulation (PMW). The times in which the LEDs are switched on and off within an interval (duty cycle) can be set in PWM.

The amperage of groups of LEDs (pixel zones) within the LED array can also be set. This enables adjustment of the brightness of an LED group. Different groups of LEDs can be switched on and off at different times in order to prevent simultaneous current spikes. This reduces the maximum current and flattens the overall curve thereof. The groups of LEDs can be selected such that adjacent LEDs belong to different groups. This flattens out thermal effects.

The supply voltage can be set globally for all of the LEDs.

The video frames, i.e. the individual digital images, are evaluated on the basis of operating parameters for the LED device that are to be set for the desired light distribution. These include, e.g.: a current performance level, in particular for at least one light-emitting diode; an increase in the performance level from one digital image to another, in particular the next, digital image, in particular in a light-emitting diode; a maximum pulse-width rate, in particular in each, light-emitting diode, and/or an average pulse-width rate, in particular in each, light-emitting diode.

After obtaining the current digital image of the desired light distribution, the necessary pulse-width rate can advantageously be calculated for the individual LEDs based on the desired light distribution.

The control unit can make a separate evaluation for each new digital image.

The evaluation can be made for each individual light-emitting diode.

The evaluation can involve a variety of measures.

It can be checked whether the current performance level (P=PW*I*U) exceeds a specific threshold value (Ps).

If the current performance level exceeds the specific threshold value, the brightness of at least one light-emitting diode can be adjusted, preferably with parameters and/or in percentages, in particular reduced.

To adjust the brightness, at least one corresponding pulse-width rate can be adjusted in the at least one light-emitting diode. The amperage of a corresponding group of LEDs and/or the voltage of the LED array can also be adjusted.

It is also possible to analyze the change in performance through a succession of images, in order to preferably limit an increase in the performance level (maximum performance increase for each successive image). This protects the hardware.

If it has been determined through the evaluation of the digital images that the increase (dP) in performance level differs from a specific threshold level change, e.g. exceeds a maximum threshold level change, the increase in the performance level for at least one relevant light-emitting diode can be adjusted, preferably with parameters and/or in percentages, in particular reduced.

The increase in performance level from one digital image to another, in particular the next, digital image can be limited, or increased in percentages from one image to the next. It is also possible to split the increase in the performance level between one zone of the light-emitting diode lamp and at least one other, in particular adjacent, zone, or numerous zones of the light-emitting diode lamp.

The current performance level (P=PW*I*U), corresponding to the voltage setting, can also be checked in the analysis. The values can be compared with a corresponding efficiency table, and the voltage setting for the current performance level can be adjusted to the corresponding table value.

The evaluation can also contain a PWM analysis.

The maximum pulse-width rate can also be checked for each light-emitting diode. The control unit can then check whether the maximum pulse-width rate lies within an efficient PWM range (e.g. within a threshold value range of 70% to 85%). If the maximum pulse-width rate is outside the efficient PWM range, an adjustment can be calculated and made on the basis of this difference.

If the maximum pulse-width rate differs from a specific efficient threshold value range, the brightness for the at least one relevant light-emitting diode can be adjusted, preferably with parameters and/or in percentages, in particular to bring it closer to the determined efficient threshold level range.

The brightness of the light-emitting diode can be adjusted by adjusting a corresponding pulse-width rate, amperage, and/or voltage. The adjustment can be made in a parameterized manner, e.g. based on the difference between the maximum pulse-width rate and the efficient threshold level range.

Furthermore, an average pulse-width rate can be used for evaluating the light-emitting diodes.

The average pulse-width rate can preferably be used for adjusting a pulse-width modulated amperage control. The average pulse-width rate can be used to vary the times in which the light-emitting diodes are switched on and off in different zones of the light-emitting diode lamp, preferably distributed uniformly over an interval. This prevents current spikes and flattens the current curve for controlling and/or regulating the lamp.

The pulse-width rates and the performances can be analyzed in every image. The adjustments can preferably be made according to a parameterized threshold level change to enable consistent operation and prevent jumping or flickering when generating the light distribution.

A more efficient operating mode for the LEDs can be obtained with the evaluation of the current digital image for the desired light distribution, such that thermal power losses are reduced, the degradation of the LEDs is minimized, and the light output is improved.

The evaluation can be made on every second video frame, for example, every 20 milliseconds. It is also conceivable to evaluate every video frame, or every third video frame.

As explained above, the brightnesses of the light-emitting diodes can be adjusted when controlling and/or regulating them. The brightnesses can be adjusted by adjusting individual pulse-width rates, amperages of groups, and/or the voltage for the entire lamp. The adjustments to the brightness based on the evaluation can preferably be with parameters and/or by percentages, e.g. based on the current difference between an operating parameter and a corresponding threshold value. This results in a more consistent operation of the light-emitting diode lamp, and prevents jumping or flickering when generating the light distribution.

The following operating parameter for the light-emitting diode lamp can be advantageously used for evaluating video data: a current performance level, in particular for at least one light-emitting diode.

This allows performance limits to be accounted for. The amperage and voltage can be better taken into account in the PWM by this means.

When evaluating the digital image, a current performance level can be compared with at least one specific threshold value, e.g. a maximum threshold value. This makes it possible to advantageously account for performance limits for the light-emitting diodes.

If it is determined that a current performance level differs from a specific threshold value when evaluating the digital image, e.g. exceeding it, the brightness of a light-emitting diode can be adjusted, preferably with parameters and/or by percentages (based on the difference), e.g. reduced. The brightness can be adjusted by adjusting the corresponding pulse-width rate, amperage, and/or voltage. The adjustment can preferably take place in a parameterized manner, e.g. depending on the difference between the current performance level and the specific threshold value.

The following operating parameter for the light-emitting diode lamp can be advantageously used to evaluate the digital image: an increase in the performance level from one digital image to another, in particular the next, digital image, in particular for at least one light-emitting diode.

The maximum performance increase for the light-emitting diodes for each successive image can be limited in this manner.

When evaluating the digital image, an increase in the performance level from one digital image to another, in particular the next, digital image, can be compared with at least one specific change threshold value, e.g. a maximum change threshold value. The maximum performance increase for each successive image can be easily limited in this manner.

When it is determined that an increase in the performance level differs from a specific change threshold value in the evaluation of the digital image, e.g. exceeding a maximum change threshold value, the increase in the performance level for the light-emitting diode can be adjusted, preferably with parameters and/or by percentages, in particular reduced. In this case, the increase in the performance level from one digital image to another, in particular the next, digital image, can be limited, preferably with parameters and/or by percentages (e.g. based on the difference). Performance fluctuations from one image to the next can be prevented in this manner. The increase in the performance level can also be split between one zone of the light-emitting diode lamp and at least one other, in particular adjacent, zone, or numerous zones of the light-emitting diode lamp. This prevents performance fluctuations between one zone and another.

Voltage settings can also be used to check the current performance level. This can ensure that the optimal voltage supply is set using a performance map for the current performance level.

The following operating parameter for the light-emitting diode lamp can also be used for evaluating the digital image: a maximum pulse-width rate in at least one, preferably each, light-emitting diode.

Efficiency limits can be maintained for individual light-emitting diodes by this means.

When evaluating the digital image, a maximum pulse-width rate can be compared with a specific efficiency threshold level range. Efficiency limits for individual light-emitting diodes can be easily maintained by this means.

If it is determined that the maximum pulse-width rate differs from the specific efficiency threshold value range when evaluating the digital image, brightness can be adjusted by controlling and/or regulating at least one light-emitting diode. The brightness can be adjusted by adjusting a corresponding pulse-width rate, amperage, and/or voltage. The adjustment can preferably take place in a parameterized manner, e.g. based on the difference between the maximum pulse-width rate and the specific efficiency threshold value range.

The following operating parameter for the light-emitting diode lamp can also be used for evaluating the digital image: an average pulse-width rate for all of the light-emitting diodes.

The average pulse-width rate can preferably be used to adjust a pulse-width modulated amperage.

Advantageously, it is also possible to vary the times in which the light-emitting diodes are switched on and/or off in different zones of the light-emitting diode lamp based on the average pulse-width rate. When the average pulse-width rate is known, the times in which the light-emitting diodes are switched on and/or off can be distributed evenly over an operating interval.

It is also conceivable to make use of a current performance level and/or increase in the performance level, ideally prior to the maximum and/or average pulse-width rate. The settings for the amperage and voltage supply can be advantageously used in the pulse-width modulation in this manner.

It is also conceivable that when acquiring sensor data regarding the current environmental and operating conditions for the light-emitting diode lamp, in particular in the form of environmental and operating conditions for a vehicle, at least one of the following sensors can be used: a camera, e.g. mounted on the front of the vehicle; a sensor for detecting the inclination of the light-emitting diode lamp, in particular a tilting of the vehicle; an orientation sensor for detecting the orientation of the light-emitting diode lam, e.g. in the form of a steering angle sensor for the vehicle; a speed sensor; and/or a position sensor, e.g. in the form of a GPS sensor, etc.

The current environmental and operating conditions of the light-emitting diode lamp can be advantageously determined in this manner and used to generate an appropriate light distribution.

The digital image of the desired light distribution can be created dynamically, in the form of a video. The digital image can be decoded for controlling and/or regulating the light-emitting diodes, in particular in that the video data are decoded dynamically. The video data can preferably be decoded in specific amperages of a pulse-width modulated current, preferably for at least one zone of the light-emitting diode lamp, and/or in individual pulse-width rates, preferably for the individual light-emitting diodes. This enables a coordinated setting of the amperages and the individual pulse-width rates.

It is conceivable to control the light-emitting diodes with a pulse-width modulated current at a specific amperage when controlling and/or regulating light-emitting diodes based on the evaluation, with this amperage of the pulse-width modulated current intended for a zone of the light-emitting diode lamp.

It is also conceivable to control each of the light-emitting diodes with an individual pulse-width rate when controlling and/or regulating light-emitting diodes based on the evaluation, in order to set individual brightnesses for the light-emitting diodes. There can be corresponding power sources for the light-emitting diodes for this.

It is also conceivable to control the light-emitting diodes with a supply voltage when controlling and/or regulating light-emitting diodes based on the evaluation, in which case the supply voltage is supplied globally to all light-emitting diodes.

It is fundamentally conceivable to obtain the digital images at a specific image rate, e.g. 100 images/second. The digital images can then be evaluated at a desired evaluation rate, e.g. 100, 50, 33, or 25 images/second. In other words, not every digital image must be evaluated and used for the control. It is conceivable to evaluate and use every second image for the control.

The desired evaluation rate can be selected on the basis of the determined image rate, e.g. at the same rate, at half the rate, at one third of the rate, or at one quarter of the rate.

The invention also results in a computer program that contains commands with which a computer can execute the method described above. The same advantages can be obtained therewith that are described above.

The invention results in a corresponding control unit for controlling and/or regulating a high-definition light-emitting diode lamp, preferably with numerous, e.g. 16,000 to 25,000, light-emitting diodes, preferably for a vehicle, which contains a memory and a computer, in which code is stored in the memory with which the computer can execute the method described above. The same advantages can be obtained therewith that are described above.

The invention results in a corresponding light-emitting diode lamp, in particular a high-definition light-emitting diode lamp, preferably with numerous, e.g. 16,000 to 25,000 light emitting diodes, preferably for a vehicle, which contains such a control unit. The same advantages can be obtained therewith that are described above.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 shows an exemplary architecture for executing a method for controlling a light-emitting diode lamp.

DETAILED DESCRIPTION OF THE DRAWINGS

The invention results in a method for controlling and/or regulating a high-definition light-emitting diode lamp 10, preferably with numerous, e.g. 16,000 to 25,000 light-emitting diodes 11 (LEDs), arranged in an array or matrix, etc., e.g. on a single semiconductor substrate. The light-emitting diode lamp 10 can be a headlamp, e.g. an HD SSL headlamp (high-definition solid state lighting). The light-emitting diode lamp 10 can be used in a vehicle, preferably when the vehicle is moving.

The method comprises the following steps, which can be executed dynamically: 101—acquiring sensor data SD regarding the current environmental and operating conditions for the light-emitting diode lamp 10, in particular in the form of corresponding environmental and operating conditions for the vehicle; 102—providing a digital image AB, preferably in the form of a video, of a desired light distribution LV based on the sensor data SD; 103—evaluating the digital image AB to control and/or regulate light-emitting diodes 11 based on at least one operating parameter BP for the light-emitting diode lamp 10 that is to be set in particular for the desired light distribution LV; 104—controlling and/or regulating light-emitting diodes 11 to generate the desired light distribution LV based on the evaluation.

A high-definition light distribution can be generated with the method, which can be adapted to the changing environmental and operating conditions. The current environmental and operating conditions are detected and used to create a digital image AB in the form of a video frame from a continuously generated video for a desired light distribution LV.

The digital image AB can be created in a higher-order control unit 110 in the vehicle, and sent to the control unit 100 for the light-emitting diode lamp 10. It is also possible for the digital image AB to be created in the control unit 100 for the light-emitting diode lamp 10. In this case, the control unit 100 for the light-emitting diode lamp 10 can obtain the sensor data SD regarding the current environmental and operating conditions for the light-emitting diode lamp 10, or the corresponding environmental and operating conditions for the vehicle, from the higher-order control unit 110.

The control unit 100 for the light-emitting diode lamp 10 can evaluate the digital image AB, preferably based on at least one operating parameter BP for the light-emitting diode lamp 10, and control the individual LEDs in the light-emitting diode lamp 10 based on this evaluation, in order to generate the desired high-definition light distribution LV in front of the vehicle with the LED array.

The sensors for detecting the environmental and operating conditions can include, e.g. a front camera, sensors for detecting a tilting of the vehicle, steering angle sensors, speed sensors, GPS, etc. The environmental and operating conditions can change dynamically. The desired light distributions LV (and the digital images AB for controlling the LED array) are advantageously constantly recalculated. A new video frame containing the digital image data for the desired light distribution LV can be created every 10 milliseconds, for example, i.e. 100 "images" are created each second.

The brightness of each LED in the LED array can be controlled individually with pulse-width modulation. The times at which the LEDs are switched on and off, and therefore the pulse-width rate PW within a specific interval (duty cycle), can be set with the pulse-width modulation.

Moreover, the amperage Ia of groups or zones 12 of LEDs within the LED array can be set. This can also affect the brightness of this LED zone. Different zones 12 of LEDs can be switched on and off at different times in order to avoid simultaneous current spikes. This reduces the maximum current I, and flattens the current curve for controlling the LED lamp. The zones 12 of LEDs can be selected such that adjacent LEDs belong to different zones 12. This prevents overheating of the LEDs.

The supply voltage U can be set globally for all of the LEDs.

The digital image data, or the individual video frames are evaluated according to the invention based on operating parameters BP for the light-emitting diode lamp 10, which are to be set to obtain the desired light distribution LV. These can include the following operating parameters BP: a current performance level P; an increase dP in the performance level P from one digital image AB to another, in particular the next, digital image AB; a maximum pulse-width rate PWmax for preferably each light-emitting diode 11; and/or an average pulse-width rate PWmitt for the light-emitting diodes 11.

After obtaining a new digital image AB of the desired light distribution LV, the necessary pulse-width rates PW for the individual LEDs can be calculated based on the desired light distribution LV.

The control unit can make a separate evaluation for each (or every second, third, fourth, etc.) new digital image AB.

The evaluation can be made for each individual pixel, i.e. the individual light-emitting diodes 11.

The evaluation can take different measures into account.

Among other things, it is possible to check whether the current performance level (P=PW*I*U) exceeds a specific threshold level Ps.

If the current performance level exceeds the specific threshold level Ps, the brightness of the at least one relevant light-emitting diode 11 can be adjusted, e.g. reduced.

To adjust the brightness, at least one pulse-width rate PW can be adjusted. A corresponding amperage of the corresponding LED group, and/or a corresponding voltage of the LED array, can also be adjusted.

Furthermore, the change in performance between successive images can be analyzed in order to limit an increase in the performance level P to a maximum increase between successive images. This protects the hardware.

If it is determined in the evaluation of the digital image AB that the increase dP in the performance level P differs from a specific change threshold level dPs, e.g. by exceeding a maximum change threshold level, the increase dP in the performance level P of the at least one relevant light-emitting diode 11 can be adjusted, in particular reduced.

The increase dP in the performance level P from one digital image AB to another, in particular the next, digital image AB can be limited for this, e.g. such that it increased by percentages from one image AB to the next image AB. The increase dP in the performance level P can also be split between one zone 12 of the light-emitting diode lamp 10 and at least one other, in particular adjacent, zone, or numerous zones, of the light-emitting diode lamp 10.

Furthermore, the voltage levels can be checked in the analysis of the current performance level P=PW*I*U. The values can be compared with a stored best efficiency table, and the voltage levels for the current performance level P can be adjusted to the corresponding values in the table.

The evaluation can also include an analysis of the pulse-width modulation.

A maximum pulse-width rate PWmax can be checked for each light-emitting diode 11. The control unit can check whether the maximum pulse-width rate PWmax lies within an efficient PW range, e.g. in a threshold value range of PW1=70% to PW2=85%. If the maximum pulse-width rate PWmax is outside the efficient PW range, an adjustment can be made based on the difference.

When the maximum pulse-width rate PWmax is outside the efficient threshold value range PW1 to PW2, the brightness can be adjusted by controlling and/or regulating a relevant light-emitting diode 11, such that the new, or adjusted, brightness is closer to the efficient threshold range PW1 to PW2. The brightness can be adjusted by adjusting a corresponding pulse-width rate PW, amperage, and/or voltage. The adjustment can take place in a parameterized manner, e.g. based on the difference between the maximum pulse-width rate PWmax and the efficient threshold range PW1 to PW2 that has been established.

Furthermore, an average pulse-width rate PWmitt can be used for the evaluation of the light-emitting diodes 11.

The average pulse-width rage PWmitt can preferably be used to adjust a pulse-width modulated current regulation over an interval.

The average pulse-width rate PWmitt can be used to vary the times at which the light-emitting diodes 11 are switched on and off in different zones 12 of the light-emitting diode lamp 10, to preferably distribute them evenly over an interval.

It is also conceivable to use a current performance level P and/or the increase dP in the performance level P, ideally prior to the maximum pulse-width rate PWmax and/or the average pulse-width rate PWmitt are used in the evaluation of the digital image AB in order to advantageously use the settings for the amperages Ia and the supply voltage U in the pulse-width modulation.

The pulse-width rate PW and the performance P can be analyzed for each, every second, every third, or every fourth digital image AB.

The adjustments can be made according to a parameterized threshold level change to enable a smooth operation and prevent jumping and flickering in the light distribution LV. By way of example, this can be determined with an adjustment parameter in the form of the function p=f(PWmax, PW2), in which PWneu can be determined using the adjustment parameter: PWneu=f(p, PWmax).

A more efficient operating mode can be set for the LEDs based on the evaluation of the current digital image AB for the desired light distribution LV, such that thermal power losses are reduced, the degradation of the LEDs is decreased, and the light output is improved.

The evaluation can be made on every second video frame, e.g. every 20 milliseconds. It is also conceivable to make the evaluation for every video frame, or just for every third video frame.

A computer program for executing the method, a control unit 100 for executing the method, and a light-emitting diode lamp 10 that has a such a control unit 100, are also part of the invention.

The above explanations of the invention are merely exemplary. As a matter of course, individual features thereof can be freely combined with one another, as long as this makes sense, without abandoning the framework of the present invention.

LIST OF REFERENCE SYMBOLS

100 control unit
110 control unit
10 light-emitting diode lamp
11 light-emitting diode
12 zone
SD sensor data
AB digital image
LV light distribution
BP operating parameter
I current
Ia amperage
U supply voltage
P performance level
Ps threshold value
dP performance increase
dPs change threshold value
PW pulse-width rate
PWmax maximum pulse-width rate
PWmitt average pulse-width rate
PW1, PW2 determined efficient threshold level range

We claim:

1. A method for controlling and/or regulating a high-definition light-emitting diode lamp containing a plurality of light-emitting diodes, the method comprising the steps of:

acquiring sensor data regarding a current environmental and operating situation for the light-emitting diode lamp in the form of corresponding environmental and operating conditions for a vehicle;

creating a digital image of a desired light distribution based on the sensor data;

evaluating the digital image to control and/or regulate the plurality of light-emitting diodes based on at least one operating parameter of the light-emitting diode lamp; and controlling and/or regulating the plurality of light-emitting diodes to generate the desired light distribution based on the evaluation, wherein the steps of the method are carried out dynamically, wherein the at least one operating parameter of the light-emitting diode lamp used for evaluating the digital image includes a maximum pulse-width rate for at least one light-emitting diode of the plurality of light-emitting diodes, wherein the maximum pulse-width rate is compared with a specific efficiency threshold level range when evaluating the digital image, wherein when the maximum pulse-width rate differs from the specific efficiency threshold level range when evaluating the digital image, a brightness level of at least one light-emitting diode of the plurality of light-emitting diodes is adjusted when controlling and/or regulating a specific light-emitting diode of the plurality of light-emitting diodes, and wherein the brightness level is adjusted by adjusting a corresponding pulse-width rate, amperage, and/or voltage.

2. The method according to claim 1, wherein the at least one operating parameter of the light-emitting diode lamp includes a current performance level of at least one light-emitting diode of the plurality of light-emitting diodes, used for evaluating video data.

3. The method according to claim 2, wherein the current performance level is compared with at least one specific performance threshold value to evaluate the digital image.

4. The method according to claim 3, wherein when the current performance level differs from or exceeds the at least one specific performance threshold value when evaluating the digital image, the brightness level of at least one light-emitting diode of the plurality of light-emitting diodes is adjusted by adjusting the corresponding pulse-width rate, amperage, and/or voltage.

5. The method according to claim 1, wherein the at least one operating parameter of the light-emitting diode lamp includes an increase in a performance level from one digital image to another digital image for least one light-emitting diode of the plurality of light-emitting diodes, which is used to evaluate the digital image.

6. The method according to claim 5, wherein the increase in the performance level from one digital image to another digital image is compared with at least one specific change threshold value when evaluating the digital image.

7. The method according to claim 6, wherein when the increase in the performance level differs from the at least one specific change threshold value upon evaluating the digital image, the increase in the performance level is adjusted when controlling and/or regulating at least one light-emitting diode of the plurality of light-emitting diodes.

8. The method according to claim 1, wherein voltage settings are used to check a current performance level for at least one light-emitting diode of the plurality of light-emitting diodes, wherein an optimal voltage level is set for the current performance level using a performance map.

9. A computer program stored on a non-transitory computer readable medium, comprising commands, with which the method according to claim 1 is executed when the program is executed on a computer.

10. A control unit for controlling and/or regulating a high-definition light-emitting diode lamp with a plurality of light-emitting diodes, the control unit comprising:

a non-transitory memory and a computer, wherein code is stored in the memory, and wherein the method according to claim 1 is executed when the code is executed by the computer.

11. A light-emitting diode lamp comprising:

a plurality of light-emitting diodes; and the control unit of claim 10.

12. The method according to claim 7, wherein the increase in the performance level from one digital image to another digital image is limited, and/or wherein the increase in the performance level is split between one zone of the light-emitting diode lamp and at least one other zone or numerous zones of the light-emitting diode lamp.

13. A method for controlling and/or regulating a high-definition light-emitting diode lamp containing a plurality of light-emitting diodes, the method comprising the steps of:

acquiring sensor data regarding a current environmental and operating situation for the light-emitting diode lamp in the form of corresponding environmental and operating conditions for a vehicle;

creating a digital image of a desired light distribution based on the sensor data;

evaluating the digital image to control and/or regulate the plurality of light-emitting diodes based on at least one operating parameter of the light-emitting diode lamp; and controlling and/or regulating the plurality of light-emitting diodes to generate the desired light distribution based on the evaluation, wherein the steps of the method are carried out dynamically, wherein the at least one operating parameter of the light-emitting diode lamp includes an increase in a performance level from one digital image to another digital image for least one light-emitting diode of the plurality of light-emitting diodes, which is used to evaluate the digital image, wherein the increase in the performance level from one digital image to another digital image is compared with at least one specific change threshold value when evaluating the digital image, wherein when the increase in the performance level differs from the at least one specific change threshold value upon evaluating the digital image, the increase in the performance level is limited and/or the increase in the performance level is split between one zone of the light-emitting diode lamp and at least one other zone or numerous zones of the light-emitting diode lamp when controlling and/or regulating at least one light-emitting diode of the plurality of light-emitting diodes.

14. A computer program stored on a non-transitory computer readable medium, comprising commands, with which the method according to claim 13 is executed when the program is executed on a computer.

15. A control unit for controlling and/or regulating a high-definition light-emitting diode lamp with a plurality of light-emitting diodes, the control unit comprising:

a non-transitory memory and a computer, wherein code is stored in the memory, and wherein the method according to claim 13 is executed when the code is executed by the computer.

16. A light-emitting diode lamp comprising:

a plurality of light-emitting diodes; and the control unit of claim 15.

17. A method for controlling and/or regulating a high-definition light-emitting diode lamp containing a plurality of light-emitting diodes, the method comprising the steps of:

acquiring sensor data regarding a current environmental and operating situation for the light-emitting diode lamp in the form of corresponding environmental and operating conditions for a vehicle;

creating a digital image of a desired light distribution based on the sensor data;

evaluating the digital image to control and/or regulate the plurality of light-emitting diodes based on at least one operating parameter of the light-emitting diode lamp; and controlling and/or regulating the plurality of light-emitting diodes to generate the desired light distribution based on the evaluation, wherein the steps of the method are carried out dynamically, wherein the at least one operating parameter of the light-emitting diode lamp, or a change in the at least one operating parameter from one digital image to another digital image, is compared with at least one predefined threshold value when evaluating the digital image, wherein when the at least one operating parameter, or the change in the at least one operating parameter, differs from the at least one predefined threshold value upon evaluating the digital image, a brightness level of at least one light-emitting diode of the plurality of light-emitting diodes is adjusted when controlling and/or regulating a specific light-emitting diode of the plurality of light-emitting diodes, and wherein the brightness level is adjusted by adjusting a corresponding pulse-width rate, amperage, and/or voltage.

18. A computer program stored on a non-transitory computer readable medium, comprising commands, with which the method according to claim 17 is executed when the program is executed on a computer.

19. A control unit for controlling and/or regulating a high-definition light-emitting diode lamp with a plurality of light-emitting diodes, the control unit comprising:

a non-transitory memory and a computer, wherein code is stored in the memory, and wherein the method according to claim 17 is executed when the code is executed by the computer.

20. A light-emitting diode lamp comprising:

a plurality of light-emitting diodes; and the control unit of claim 19.

* * * * *